United States Patent
Kusafuka et al.

(10) Patent No.: US 11,899,218 B2
(45) Date of Patent: Feb. 13, 2024

(54) HEAD-UP DISPLAY AND MOVABLE BODY

(71) Applicant: KYOCERA CORPORATION, Kyoto (JP)

(72) Inventors: Kaoru Kusafuka, Tokyo (JP); Mitsuhiro Murata, Yao (JP); Sunao Hashimoto, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 17/774,879

(22) PCT Filed: Nov. 12, 2020

(86) PCT No.: PCT/JP2020/042319
§ 371 (c)(1),
(2) Date: May 6, 2022

(87) PCT Pub. No.: WO2021/095817
PCT Pub. Date: May 20, 2021

(65) Prior Publication Data
US 2023/0019904 A1   Jan. 19, 2023

(30) Foreign Application Priority Data

Nov. 13, 2019   (JP) ................. 2019-205777

(51) Int. Cl.
*G02B 27/01* (2006.01)
*G02B 30/26* (2020.01)
(Continued)

(52) U.S. Cl.
CPC ..... *G02B 27/0179* (2013.01); *G02B 27/0101* (2013.01); *G02B 30/26* (2020.01);
(Continued)

(58) Field of Classification Search
CPC ............ B60K 35/00; B60K 2370/1529; B60K 2370/31; B60K 2370/52; G02B 27/01;
(Continued)

(56) References Cited

U.S. PATENT DOCUMENTS

2007/0279755 A1   12/2007   Hitschmann et al.
2010/0315577 A1   12/2010   Li et al.
(Continued)

FOREIGN PATENT DOCUMENTS

| | | |
|---|---|---|
| EP | 2045647 A1 | 4/2009 |
| JP | 2009-8722 A | 1/2009 |

(Continued)

*Primary Examiner* — Nitin Patel
*Assistant Examiner* — Cory A Almeida
(74) *Attorney, Agent, or Firm* — Procopio, Cory, Hargreaves & Savitch LLP (57) ABSTRACT

A head-up display and a movable body can display a virtual image viewable at a position nearer a user. The head-up display includes a display device that displays a first image and emits image light from the first image in a first direction, a first optical member located in the first direction from the display device, and a second optical member located between the display device and the first optical member in the first direction. The second optical member reflects the (Continued)

first image in a first plane direction and a second plane direction and displays a virtual image of the first image in a space between the first optical member and a user.

11 Claims, 10 Drawing Sheets

(51) Int. Cl.
*G06F 3/01* (2006.01)
*G03B 35/24* (2021.01)
*G02B 30/31* (2020.01)
*B60K 35/00* (2006.01)

(52) U.S. Cl.
CPC ............ *G02B 30/31* (2020.01); *G03B 35/24* (2013.01); *G06F 3/013* (2013.01); *B60K 35/00* (2013.01); *B60K 2370/1529* (2019.05); *B60K 2370/31* (2019.05); *B60K 2370/52* (2019.05); *G02B 2027/0134* (2013.01); *G02B 2027/0181* (2013.01); *G02B 2027/0183* (2013.01)

(58) Field of Classification Search
CPC ............ G02B 27/0101; G02B 27/0179; G02B 30/26; G02B 30/31; G02B 2027/0134; G02B 2027/0181; G02B 2027/0183; G03B 35/24; G06F 3/013
See application file for complete search history.

(56) References Cited

U.S. PATENT DOCUMENTS

| | | | |
|---|---|---|---|
| 2011/0074657 A1* | 3/2011 | Sugiyama | G02B 27/0101 |
| | | | 345/7 |
| 2015/0226965 A1 | 8/2015 | Kim et al. | |
| 2016/0086305 A1* | 3/2016 | Watanabe | G06V 20/588 |
| | | | 345/672 |
| 2021/0152812 A1* | 5/2021 | Ota | G02B 27/0101 |

FOREIGN PATENT DOCUMENTS

| | | |
|---|---|---|
| JP | 2017-26734 A | 2/2017 |
| WO | 2018/179786 A1 | 10/2018 |

* cited by examiner

HEAD-UP DISPLAY AND MOVABLE BODY

FIELD

The present disclosure relates to a head-up display and a movable body.

BACKGROUND

A known head-up display is described in, for example, Patent Literature 1.

CITATION LIST

Patent Literature

Patent Literature 1: Japanese Unexamined Patent Application Publication No. 2009-008722

BRIEF SUMMARY

A head-up display according to an aspect of the present disclosure includes a display device that displays a first image and emits image light from the first image in a first direction, a first optical member located in the first direction from the display device, and a second optical member located between the display device and the first optical member in the first direction. The second optical member reflects the first image in a first plane direction and a second plane direction and displays a virtual image of the first image in a space between the first optical member and a user.

A movable body according to another aspect of the present disclosure includes a head-up display. The head-up display includes a display device that displays a first image and emits image light from the first image in a first direction, a first optical member located in the first direction from the display device, and a second optical member located between the display device and the first optical member in the first direction. The second optical member causes specular reflection of the first image in a first plane direction, causes retroreflection of the first image in a second plane direction, and displays a virtual image of the first image in a space between the first optical member and a user.

BRIEF DESCRIPTION OF DRAWINGS

The objects, features, and advantages of the present disclosure will become more apparent from the following detailed description and the drawings.

DETAILED DESCRIPTION

The structure that forms the basis of a head-up display (HUD) according to one or more embodiments of the present disclosure will be described first.

A known HUD causes images having parallax between them to reach the left and right eyes of a user and displays a virtual image in the field of view of the user to be viewed as a three-dimensional (3D) image with depth, as described in Patent Literature 1.

The HUD is mounted on a vehicle and can display various items of information including map information in the user's field of view. A virtual image displayed by a known HUD is viewed as appearing to be frontward from a windshield. In some cases, a virtual image may be to appear closer to the user than the windshield.

In response to this, one or more aspects of the present disclosure are directed to a HUD and a movable body that can display a virtual image viewable at a position nearer a user.

One or more embodiments of the present disclosure will now be described with reference to the drawings. The drawings used herein are schematic and are not drawn to scale relative to the actual size of each component.

Structure of HUD System

Figure 1:
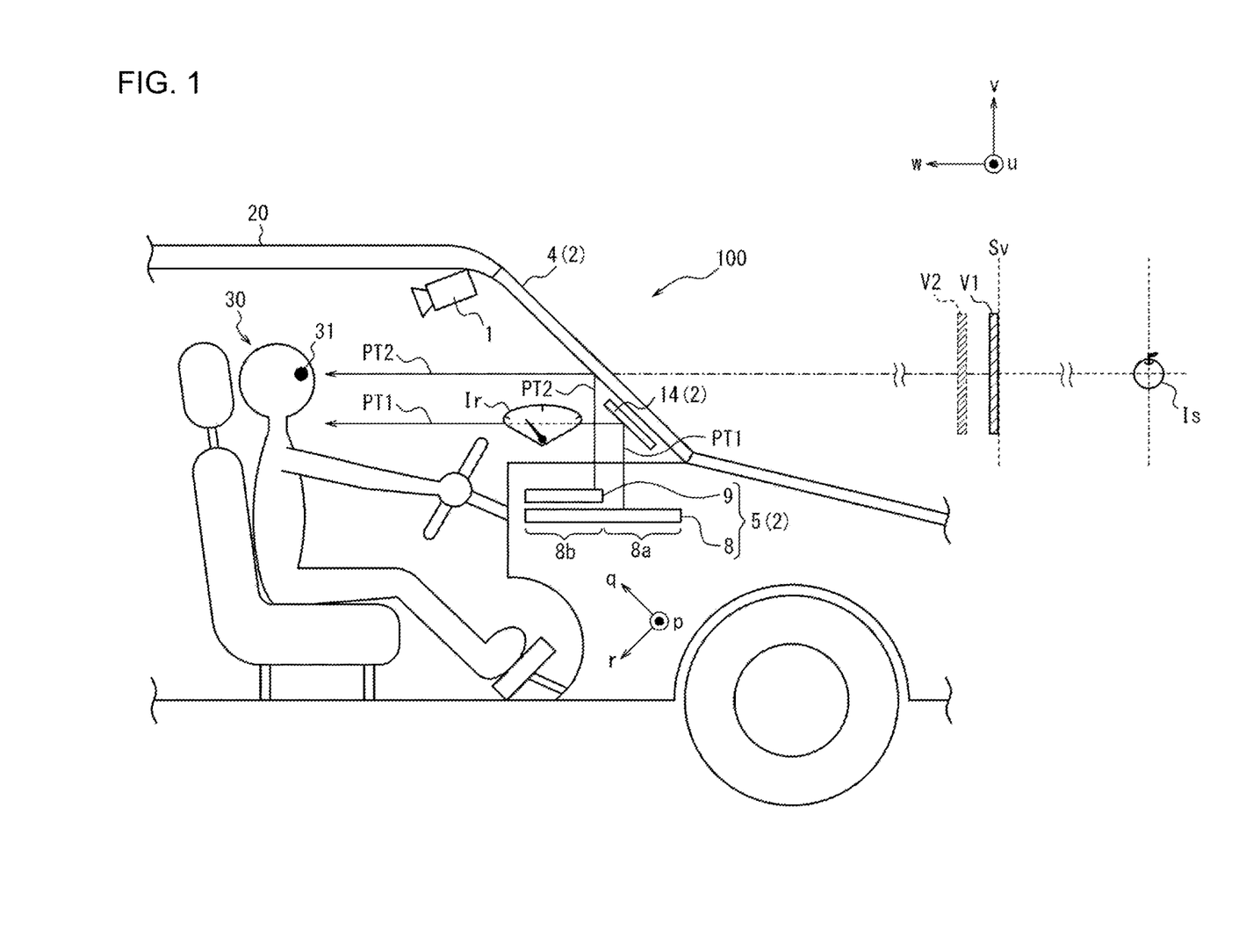
FIG. 1 is a diagram of an example head-up display (HUD) system mounted on a movable body.

As shown in FIG. 1, a HUD system 100 includes a detector 1 and a HUD 2 according to an embodiment of the present disclosure. The HUD system 100 may be mounted on a movable body 20. In FIG. 1 and FIGS. 7, 10, and 11 (described later), u-direction refers to an interocular direction, or the direction along a line passing through a left eye 31l and a right eye 31r of a user 30, w-direction refers to the front-rear direction as viewed from the user 30, and v-direction refers to the height direction perpendicular to u-direction and w-direction.

The movable body according to one or more embodiments of the present disclosure includes a vehicle, a vessel, or an aircraft. The vehicle according to one or more embodiments of the present disclosure includes, but is not limited to, an automobile or an industrial vehicle, and may also include a railroad vehicle, a community vehicle, or a fixed-wing aircraft traveling on a runway. The automobile includes, but is not limited to, a passenger vehicle, a truck, a bus, a motorcycle, or a trolley bus, and may also include another vehicle traveling on a road. The industrial vehicle includes an agricultural vehicle or a construction vehicle. The industrial vehicle includes, but is not limited to, a forklift or a golf cart. The agricultural vehicle includes, but is not limited to, a tractor, a cultivator, a transplanter, a binder, a combine, or a lawn mower. The construction vehicle includes, but is not limited to, a bulldozer, a scraper, a power shovel, a crane vehicle, a dump truck, or a road roller. The vehicle includes a man-powered vehicle. The classification of the vehicle is not limited to the above. For example, the automobile may include an industrial vehicle traveling on a road, and one type of vehicle may fall within a plurality of classes. The vessel according to one or more embodiments of the present disclosure includes a jet ski, a boat, or a tanker. The aircraft according to one or more embodiments of the present disclosure includes a fixed-wing aircraft or a rotary-wing aircraft.

Detector

The HUD system 100 includes the detector 1 to detect the positions of the eyes 31 of the user 30. The eyes 31 of the user 30 include the left eye 311 and right eye 31r of the user 30. The left eye 311 and the right eye 31r of the user 30 are herein collectively referred to as the eyes 31 without being distinguished from each other. The detector 1 outputs the detected positions of the eyes 31 of the user 30 to the HUD 2. For the HUD system 100 mounted on the movable body 20, the user 30 may be a driver of the movable body 20. The detector 1 may include an imaging device or a sensor.

For the HUD system 100 mounted on the movable body 20, the detector 1 may be attached to a rearview mirror. The detector 1 may be attached to, for example, an instrument cluster. The detector 1 may be attached to a center panel. The detector 1 may be attached to a dashboard. The detector 1 may be attached to a support of the steering wheel. The support may be at the center of the steering wheel.

For the detector 1 including an imaging device, the imaging device captures an image of a subject. The imaging device includes a camera. The imaging device includes an image sensor. The image sensor may include, for example, a charge-coupled device (CCD) image sensor or a complementary metal-oxide semiconductor (CMOS) image sensor. The imaging device is arranged to have the face of the user 30 being at the position of the subject. The detector 1 detects the position of at least one of the left eye 311 or the right eye 31r of the user 30. For example, the detector 1 may define a predetermined position as the origin and detect the direction and the amount of displacement of the positions of the eyes 31 from the origin. The detector 1 may detect the position of at least one of the left eye 311 or the right eye 31r using an image captured with the imaging device. The detector 1 may detect, with two or more imaging devices, the position of at least one of the left eye 311 or the right eye 31r as the coordinates in a 3D space.

The detector 1 may include no camera and may be connected to an external camera. The detector 1 may include an input terminal for receiving signals from the external camera. The external camera may be connected to the input terminal directly. The external camera may be connected to the input terminal indirectly through a shared network. The detector 1 including no camera may include an input terminal for receiving image signals from a camera. The detector 1 including no camera may detect the position of at least one of the left eye 311 or the right eye 31r from the image signal input into the input terminal.

For the detector 1 including a sensor, the sensor may be an ultrasonic sensor or an optical sensor. The detector 1 may detect the position of the head of the user 30 with the sensor, and detect the position of at least one of the left eye 311 or the right eye 31r based on the position of the head. The detector 1 may detect, with one sensor or two or more sensors, the position of at least one of the left eye 311 or the right eye 31r as the coordinates in a 3D space.

The detector 1 may detect, based on a detection result of the position of at least one of the left eye 311 or the right eye 31r, the moving distances of the left eye 311 and the right eye 31r in the direction in which the eyes are aligned.

The detector 1 outputs positional information indicating the positions of the eyes 31 of the user 30 to the HUD 2. The detector 1 may output, to the HUD 2, the positional information in a wired or wireless manner or through a communication network such as a controller area network (CAN).

Head-Up Display

The HUD 2 in one embodiment includes a first optical member 4, a display device 5, and a second optical member 14. The first optical member 4 and the second optical member 14 are included in an optical system. The optical system in the HUD 2 may include another optical element. The optical system in the HUD 2 may include, for example, at least one of a lens and a reflector. A mirror is an example of the reflector. The mirror may be a concave mirror. For example, the mirror may be between a parallax barrier 9 (described later) and the first optical member 4.

The first optical member 4 reflects image light emitted from the display device 5 toward the left eye 311 and the right eye 31r of the user 30. For example, the movable body 20 may include a windshield as the first optical member 4. The first optical member 4 may include a plate-like combiner for a HUD inside the windshield. In the example in FIG. 1, image light emitted from the display device 5 toward the first optical member 4 travels along an optical path PT2. The user 30 views light reaching the eyes along the optical path PT2 as a virtual image Is. In the present embodiment, the first optical member 4 is at a position in a first direction as viewed from the display device 5. The first direction is a direction in which image light is emitted from the display device 5 toward the optical system. In the example in FIG. 1, the first direction is the positive v-direction.

The second optical member 14 reflects image light emitted from the display device 5 toward the left eye 311 and the right eye 31r of the user 30. The second optical member 14 causes specular reflection of image light in a first plane direction and retroreflection of image light in a second plane direction orthogonal to the first plane direction. The structure of the second optical member 14 will be described in detail later. In the example in FIG. 1, image light emitted from the display device 5 toward the second optical member 14 travels along an optical path PT1. The user 30 views light reaching the eyes along the optical path PT1 as a virtual image Ir. In the present embodiment, the second optical member 14 is between the display device 5 and the first optical member 4 in the first direction.

The arrangement and the structure of the optical system in the HUD 2 determine the position of a virtual image plane on which image light emitted from the display device 5 forms a virtual image. The display device 5 displays a first image and a second image. The first image appears in a first area 8a on a display panel 8 in the display device 5. The second image appears in a second area 8b on the display panel 8 in the display device 5. Image light from the first image is emitted toward the second optical member 14. Image light from the second image is emitted toward the first optical member 4 through the parallax barrier 9. The second optical member 14 displays the virtual image Ir of the first image in a space between the first optical member 4 and the user 30. In other words, the virtual image Ir of the first image is displayed in an interior space of the movable body 20. The first optical member 4 causes specular reflection of the second image to display the virtual image Is of the second image in a space opposite to, across the first optical member 4, the space in which the virtual image Ir of the first image appears. In other words, the virtual image Is of the second image appears in an outdoor space frontward from the first optical member 4 as viewed from the user 30. In one example, the virtual image plane for the first image may be at a position within the range of 0.3 m to 1.0 m inclusive apart from the eyes 31 of the user 30. In one example, the virtual image plane for the second image may be at a position within the range of 1.0 m to 7.5 m inclusive apart from the eyes 31 of the user 30.

Display Device

Figure 2:
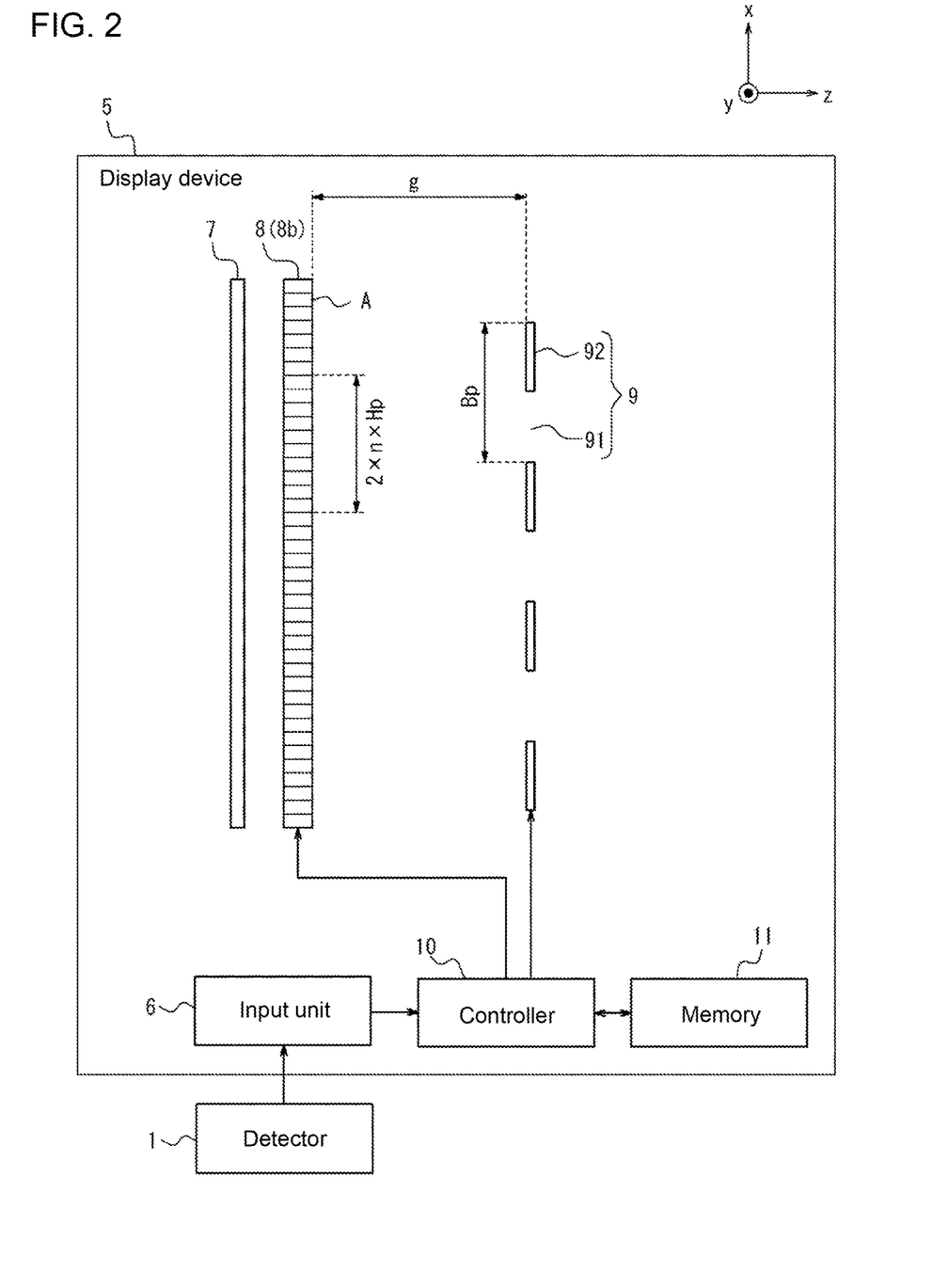
FIG. 2 is a schematic diagram of a display device.

As shown in FIG. 2, the display device 5 may include an input unit 6, an illuminator 7, the display panel 8, the parallax barrier 9 as an optical element, a controller 10, and a memory 11. The display panel 8 shown in FIG. 2 corresponds to the second area 8b in which the second image appears. For the display panel 8 corresponding to the first area 8a in which the first image appears, the parallax barrier 9 is eliminated. The parallax barrier 9 will be described in detail later.

The input unit 6 receives the positional information about the eyes 31 of the user 30 detected by the detector 1. The input unit 6 can communicate with the detector 1 in accordance with the communication scheme used by the detector 1. The input unit 6 includes an interface for wired or wireless communication. The input unit 6 may include a connector for wired communication, such as an electrical connector or an optical connector. The input unit 6 may include an antenna for wireless communication.

The illuminator 7 may illuminate the display panel 8 with planar illumination light. The illuminator 7 may include a light source, a light guide plate, a diffuser plate, and a diffuser sheet. The illuminator 7 emits, from its light source, illumination light that then spreads uniformly for illuminating the surface of the display panel 8 using, for example, the light guide plate, the diffuser plate, or the diffuser sheet. The illuminator 7 may emit the uniform light toward the display panel 8.

The display panel 8 may be, for example, a transmissive liquid crystal panel. The display panel 8 is not limited to a transmissive liquid crystal panel but may be another panel such as an organic electroluminescent (EL) panel. For the display panel 8 being a self-luminous panel, the display device 5 may not include the illuminator 7.

The controller 10 may be connected to each of the components of the HUD system 100 to control these components. The components controlled by the controller 10 include the detector 1 and the display panel 8. The controller 10 may be, for example, a processor. The controller 10 may include one or more processors. The processors may include a general-purpose processor that reads a specific program to perform a specific function, and a processor dedicated to specific processing. The dedicated processor may include an application-specific integrated circuit (ASIC). The processors may include a programmable logic device (PLD). The PLD may include a field-programmable gate array (FPGA). The controller 10 may be either a system on a chip (SoC) or a system in a package (SiP) in which one or more processors cooperate with other components. The controller 10 may include a storage to store various items of information or programs to operate each component of the HUD system 100. The storage may be, for example, a semiconductor memory. The storage may serve as a work memory for the controller 10. The storage may be included in the memory 11.

The memory 11 may include any storage device such as a random-access memory (RAM) or a read-only memory (ROM). The memory 11 stores information received by the input unit 6, information resulting from conversion by the controller 10, and other information. For example, the memory 11 stores the positional information about the eyes 31 of the user 30 obtained by the input unit 6.

Retroreflector

Figure 3:
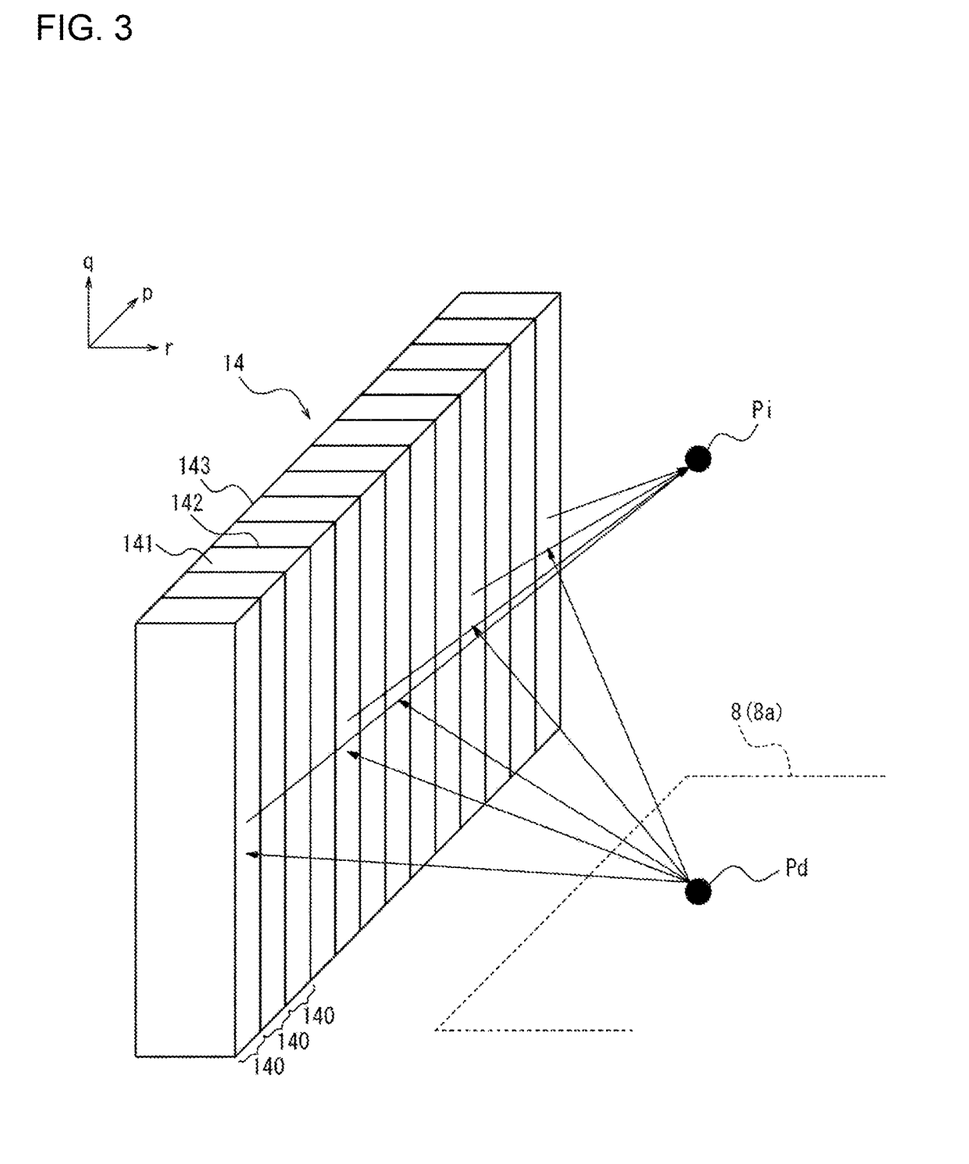
FIG. 3 is a view of a second optical member describing its reflectance properties.
Figure 4:
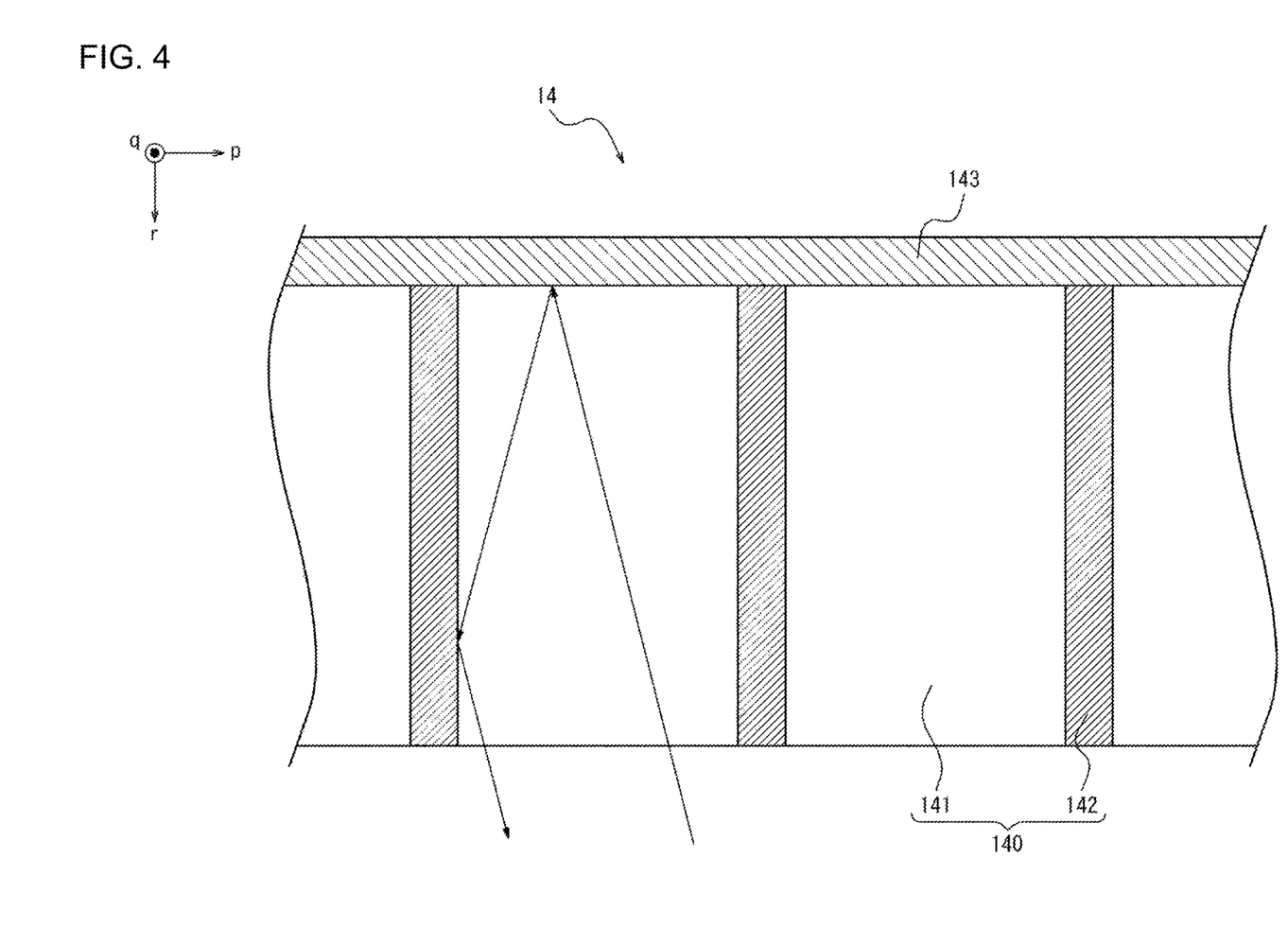
FIG. 4 is a cross-sectional view of the second optical member.

FIG. 3 is a view of the second optical member 14 describing its reflectance properties. FIG. 4 is a cross-sectional view of the second optical member 14. In the present embodiment, the second optical member 14 is a rectangular prism. In FIGS. 3, 4, and 1, r-direction corresponds to the thickness direction of the second optical member 14, p-direction is a direction perpendicular to the thickness direction of the second optical member 14 and corresponds to the width direction of the second optical member 14, and q-direction is a direction perpendicular to r-direction and p-direction and corresponds to the height direction of the second optical member 14. The second optical member 14 has its main surface in a p-q plane perpendicular to the thickness direction. The q-direction may be referred to as a first plane direction. The p-direction may be referred to as a second plane direction. The main surface is the surface having the largest area.

The second optical member 14 includes a flat first light-reflective portion 143 and multiple plates 140 placed side by side. The plates 140 each include a transparent substrate 141 and a second light-reflective portion 142.

The first light-reflective portion 143 is covered with the plates 140. The first light-reflective portion 143 includes a metal film including, for example, aluminum or a multilayer film. The metal film may be formed by, for example, vapor deposition or sputtering. The transparent substrate 141 is formed from, for example, transparent glass or resin and is elongated in q-direction. The second light-reflective portion 142 is formed by depositing a metal film including, for example, aluminum or a multilayer film on a surface of the transparent substrate 141 perpendicular to p-direction. The second light-reflective portion 142 is thus flat. As shown in FIG. 4, the first light-reflective portion 143 and the second light-reflective portion 142 may be arranged to form a right angle to form a corner mirror. The plates 140 are arranged to have the second light-reflective portions 142 parallel to one another at predetermined intervals in p-direction. The plates 140 and the first light-reflective portion 143 may be bonded to each other with an adhesive such as an epoxy resin.

In the first plane direction, the second optical member 14 includes the first light-reflective portion 143 to reflect incident light. In other words, the second optical member 14 in the first plane direction causes specular reflection. As shown in FIG. 4, in the second plane direction, the second optical member 14 includes the first light-reflective portion 143 and the second light-reflective portions 142 forming corner mirrors to reflect incident light in the incident direction. In other words, the second optical member 14 in the second plane direction causes retroreflection. Thus, as shown in FIG. 3, image light emitted from an image Pd in the first area 8a in the display panel 8 forms an image Pi in midair apart from the display panel 8 in the first plane direction. The image Pd corresponds to the first image. The image Pi corresponds to the virtual image Ir.

The HUD 2 according to the present embodiment includes the second optical member 14 to allow the virtual image Ir viewable by the user 30 to appear at a position nearer the user 30. The virtual image Ir may appear together with the virtual image Is of the second image. The user 30 can view, in detail, the virtual image Ir appearing at a position nearer the user 30. The virtual image Ir may be a display indicating the state of the movable body 20, such as a speedometer, a fuel gauge, or an odometer.

The controller 10 can change the area in which the first image appears on the display panel 8 based on the positions of the eyes 31 of the user 30. In other words, the controller 10 can change the position at which the virtual image Ir of the first image appears based on the positions of the eyes 31 of the user 30. The controller 10 may change the lower limit position at which the virtual image Ir of the first image appears in accordance with the positions of the eyes 31 of the user 30. The lower limit position may be determined to allow the user 30 driving the movable body 20 to view the entire virtual image Ir without turning the gaze away from the front. The downward direction herein corresponds to the negative v-direction in the example in FIG. 1.

The second optical member 14 may include a refractive reflector instead of the retroreflector described above. The refractive reflector may include, for example, two sheets each formed by tightly sticking rectangular parallelepiped-shaped members arranged parallel to one another. The sheets may each include the same number of rectangular parallelepiped-shaped members. The rectangular parallelepiped-shaped member is a rod formed from plastic such as transparent acrylic plastic or glass that is elongated and has a quadrangular cross section with a side length of about several hundred micrometers to several centimeters in the lateral direction perpendicular to the longitudinal direction of the member. Three of its four faces extending in the longitudinal direction can be used for light transmission or reflection. The three faces are shaped smoothly. The two sheets may each include about 100 to 20000 rectangular parallelepiped-shaped members. A light reflective film is formed on one face of the rectangular parallelepiped-shaped member extending in the longitudinal direction by, for example, depositing, for example, aluminum or silver.

Each rectangular parallelepiped-shaped member has a first face with a light absorbing film and a second face opposite to the first face. The second face is tightly stuck to a face with a light reflective film of another rectangular parallelepiped-shaped member to form the sheet. The two sheets are bonded together with either one of the two sheets rotated by 90° with respect to the other one in a manner intersecting with each other to form a reflective plane-symmetric imaging element. The rectangular parallelepiped-shaped members in one of the two sheets intersect with the rectangular parallelepiped-shaped members in the other one of the two sheets to form a micromirror unit (unit optical element). A face with a light reflective film including a set of micromirror units is a first light reflecting surface. A face with a light reflective film including a set of micromirror units in the other one of the two sheets is a second light reflecting surface. A metal film may be on a face opposite to the face including the light reflecting surface. Rectangular parallelepiped-shaped members may be joined together by, for example, soldering or blazing to form the refractive reflector.

Parallax Image

Figure 5:
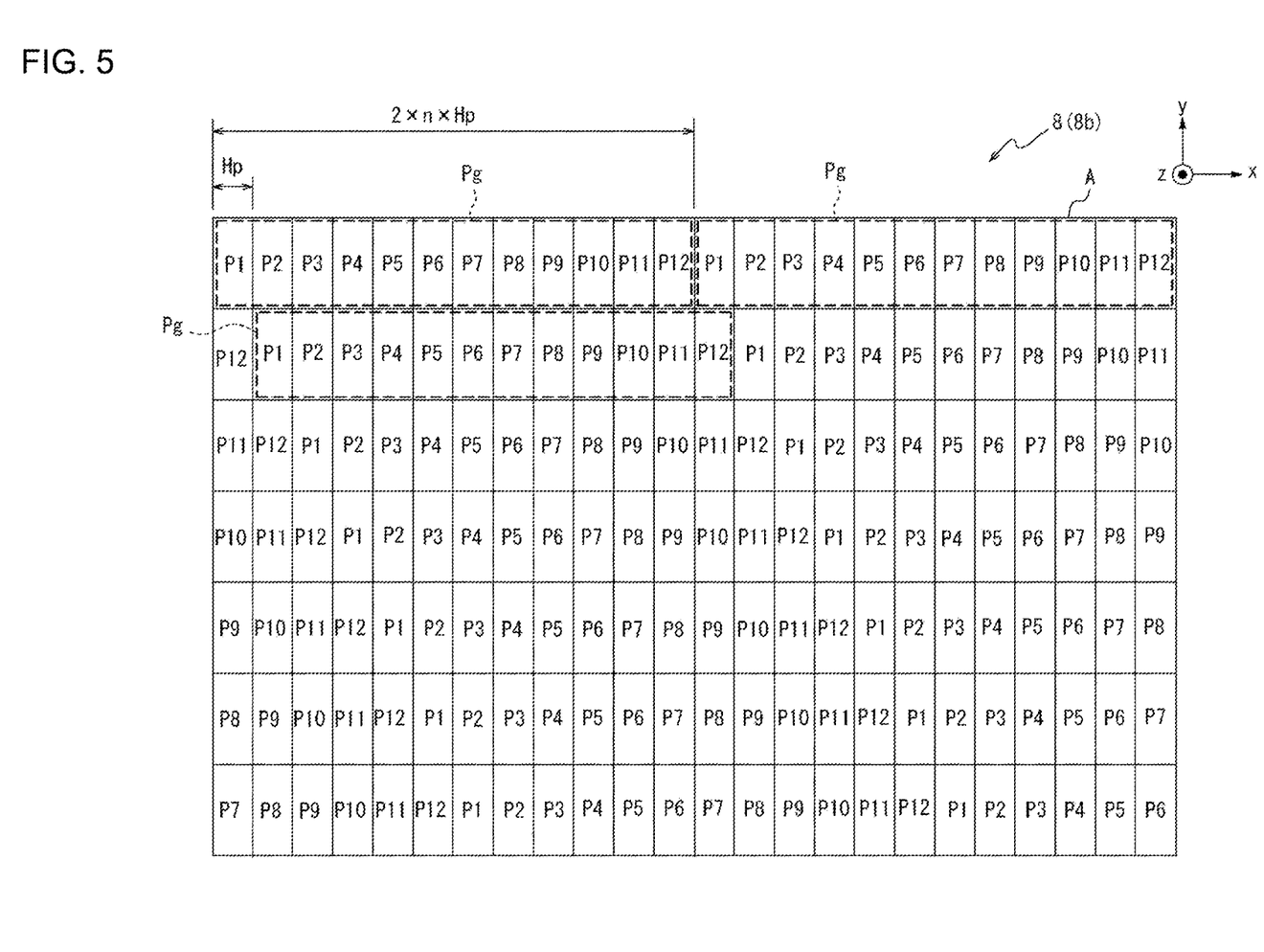
FIG. 5 is a diagram of an example display panel.

As shown in FIG. 5, the display panel 8 includes a planar active area A including multiple divisional areas. The active area A in the second area 8b displays a parallax image. The parallax image includes a left eye image and a right eye image having parallax with respect to the left eye image as described later. In the example in FIG. 5, the divisional areas are defined in x-direction and in y-direction orthogonal to x-direction. The x-direction may be referred to as a horizontal direction. The y-direction may be referred to as a vertical direction. The z-direction orthogonal to x-direction and y-direction may be referred to as a depth direction.

Each divisional area corresponds to a subpixel. Thus, the active area A includes multiple subpixels arranged in a grid in the horizontal and vertical directions.

Each subpixel has one of the colors red (R), green (G), and blue (B). One pixel may be a set of three subpixels with R, G, and B. A pixel may be referred to as a picture element. For example, multiple subpixels included in one pixel are arranged in the horizontal direction. Multiple subpixels having the same color are arranged, for example, in the vertical direction.

The multiple subpixels arranged in the active area A in the second area 8b form multiple subpixel groups Pg under control by the controller 10. The multiple subpixel groups Pg are arranged repeatedly in the horizontal direction. Each subpixel group Pg may be aligned with or shifted from the corresponding subpixel group Pg in the vertical direction. For example, the subpixel groups Pg are repeatedly arranged in the vertical direction at positions shifted by one subpixel in the horizontal direction from the corresponding subpixel group Pg in adjacent rows. The subpixel groups Pg each include subpixels in predetermined rows and columns. More specifically, the subpixel groups Pg each include (2×n×b) subpixels P1 to PN (N=2×n×b), which are consecutively arranged in b rows in the vertical direction and in 2×n columns in the horizontal direction. In the example shown in FIG. 5, n is 6, and b is 1. The active area A includes the subpixel groups Pg each including 12 subpixels P1 to P12 consecutively arranged in one row in the vertical direction and in 12 columns in the horizontal direction. In the example shown in FIG. 5, some of the subpixel groups Pg are denoted by reference signs.

Each subpixel group Pg is the smallest unit controllable by the controller 10 to display an image. The subpixels included in each subpixel group Pg are identified using the identification information P1 to PN (N=2×n×b). The subpixels P1 to PN (N=2×n×b) included in each subpixel group Pg with the same identification information are controlled by the controller 10 at the same time. For example, the controller 10 can switch the image to be displayed by the multiple subpixels P1 from the left eye image to the right eye image at the same time in all the subpixel groups Pg.

As shown in FIG. 2, the parallax barrier 9 is planar along the active area A. The parallax barrier 9 is separate from the active area A by a gap g. The parallax barrier 9 may be located opposite to the illuminator 7 from the display panel 8. The parallax barrier 9 may be located between the display panel 8 and the illuminator 7.

Figure 6:
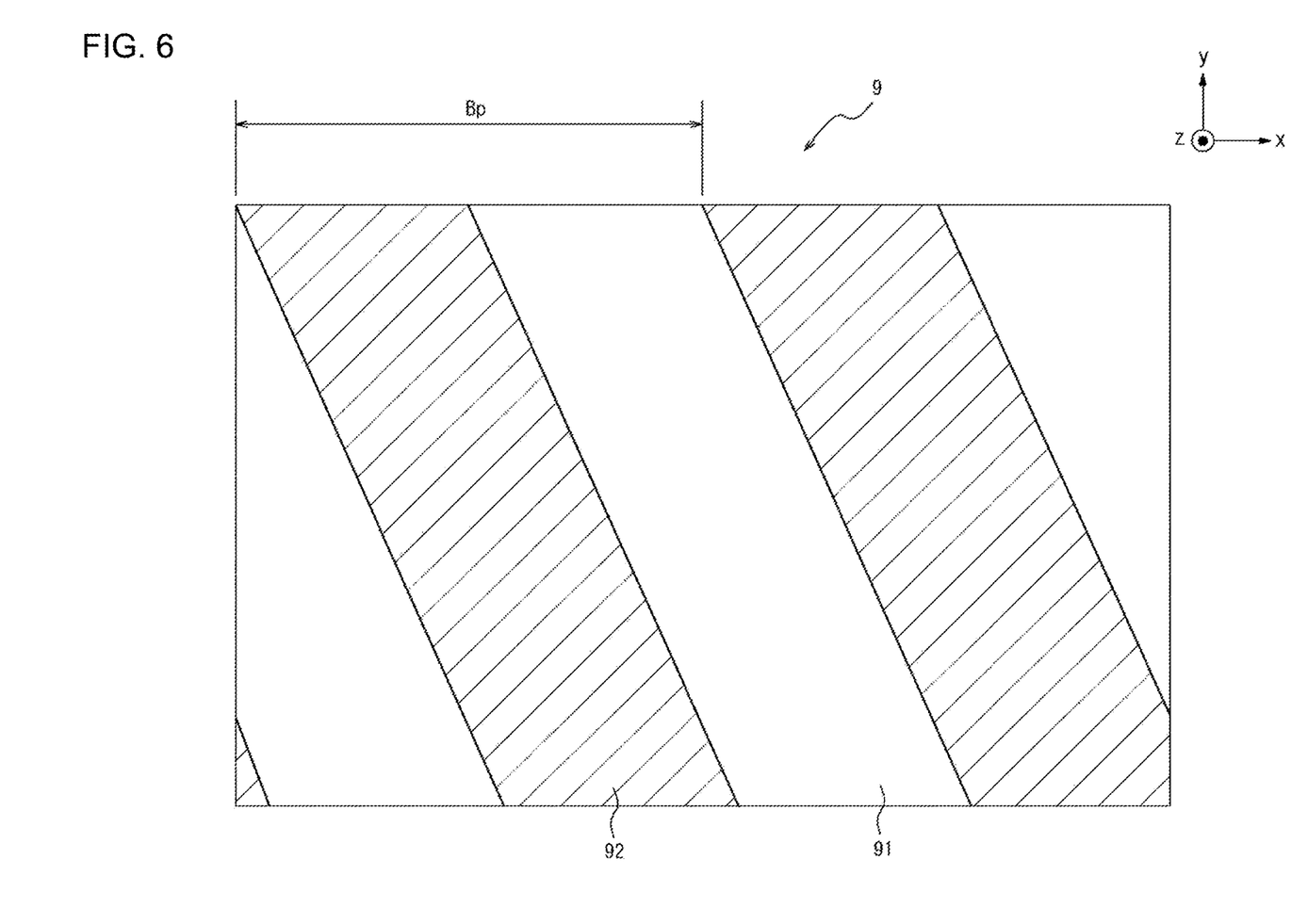
FIG. 6 is a diagram of an example parallax barrier.

The parallax barrier 9 defines the traveling direction of image light emitted from the subpixels for each of multiple transmissive portions 91 to define the visual field for the parallax image. As shown in FIG. 6, the transmissive portions 91 are strip areas each elongated in a predetermined direction in the plane. More specifically, the parallax barrier 9 includes multiple light-reducing portions 92 for reducing image light. The light-reducing portions 92 define transmissive portions 91 between adjacent light-reducing portions 92. The transmissive portions 91 have a higher light transmittance than the light-reducing portions 92. The transmissive portions 91 may have a light transmittance 10 or more times, or specifically 100 or more times, or more specifically 1000 or more times the light transmittance of the light-reducing portions 92. The light-reducing portions 92 have a lower light transmittance than the transmissive portions 91. The light-reducing portions 92 may block image light.

The transmissive portions 91 and the light-reducing portions 92 extend in a predetermined direction along the active area A. The transmissive portions 91 and the light-reducing portions 92 are arranged alternately in a direction orthogonal to the predetermined direction. For example, the predetermined direction is along a diagonal of one subpixel when the display panel 8 and the parallax barrier 9 are viewed in the depth direction. For example, the predetermined direction may be the direction that crosses t subpixels in y-direction while crossing s subpixels in x-direction (s and t are relatively prime positive integers) when the display panel 8 and the parallax barrier 9 are viewed in the depth direction. The predetermined direction may be y-direction. The predetermined direction corresponds to the direction in which the subpixel groups Pg are arranged. In the example in FIG. 5, each subpixel group Pg is shifted from the corresponding subpixel group Pg by one subpixel in y-direction and by one subpixel in x-direction. Thus, s is 1, and t is 1.

The parallax barrier 9 may be formed from a film or a plate. In this case, the light-reducing portions 92 are parts of the film or plate. The transmissive portions 91 may be slits in the film or plate. The film may be formed from resin or another material. The plate may be formed from resin, metal, or another material. The parallax barrier 9 may be formed from a material other than a film or a plate. The parallax barrier 9 may include a base formed from a light-reducing material or a material containing an additive with light-reducing properties. For the parallax barrier 9 including a film or a plate, the traveling direction of image light from the parallax image is not defined in a manner changeable dynamically. In other words, the parallax barrier 9 uses a passive method.

The parallax barrier 9 may include an optical panel. A liquid crystal shutter is an example of the optical panel. The liquid crystal shutter can control the light transmittance in accordance with a voltage being applied. The liquid crystal shutter may include multiple pixels and control the light transmittance for each pixel. The transmissive portions 91 and the light-reducing portions 92 are defined by the liquid crystal shutter and at positions corresponding to the pixels of the liquid crystal shutter. For the parallax barrier 9 including the liquid crystal shutter, the boundaries between the transmissive portions 91 and the light-reducing portions 92 may be staggered along the shapes of the pixels. For the parallax barrier 9 including the liquid crystal shutter, the traveling direction of image light from the parallax image may be defined in a manner changeable dynamically, for example, as controlled by the controller 10. In other words, the parallax barrier 9 may use an active system. For the parallax barrier 9 including the liquid crystal shutter, the traveling direction of image light from the parallax image may not be defined in a manner changeable dynamically. In other words, the parallax barrier 9 may use a passive method.

Figure 7:
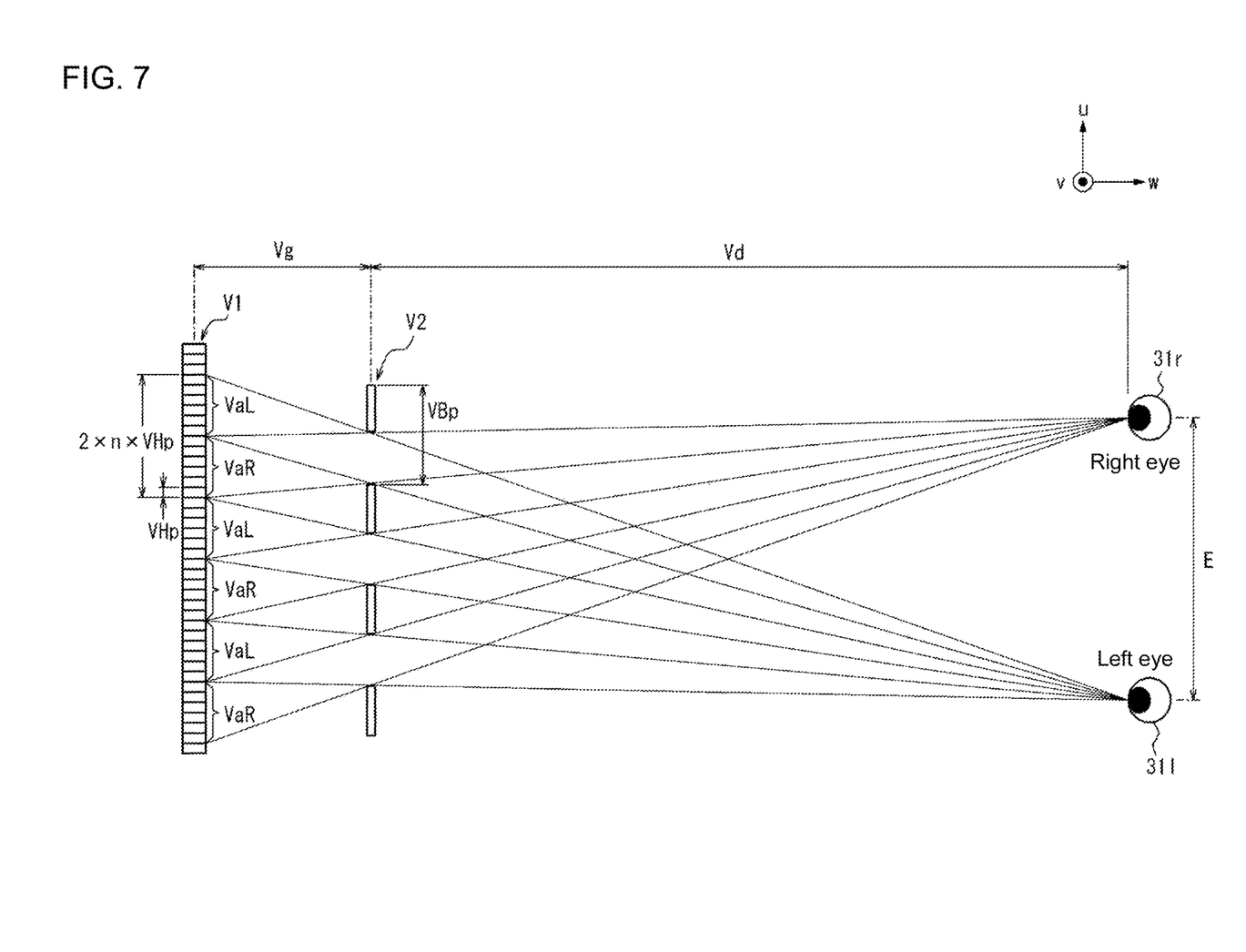
FIG. 7 is a diagram describing the relationship between a virtual image and a user's eyes.

Image light emitted from the active area A in the second area 8b partially transmits through the transmissive portions 91 to reach the first optical member 4. The image light is reflected by the first optical member 4 and reaches the eyes 31 of the user 30. This allows the eyes 31 of the user 30 to view, as a virtual image of an image appearing on the active area A, a first virtual image V1 frontward from the first optical member 4. The plane on which the first virtual image V1 appears is referred to as a virtual image plane Sv. Being frontward herein refers to the direction in which the first optical member 4 is located as viewed from the user 30. Being frontward is typically the direction of movement of the movable body 20. As shown in FIG. 7, the user 30 views an appearing image with a second virtual image V2 that is a virtual image of the parallax barrier 9 defining the direction of image light from the first virtual image V1.

The user 30 thus views the image appearing as the first virtual image V1 through the second virtual image V2. In reality, the user 30 does not view the second virtual image V2 that is the virtual image of the parallax barrier 9. However, the second virtual image V2 is hereafter referred to as appearing at the position at which the virtual image of the parallax barrier 9 is formed and as defining the traveling direction of image light from the first virtual image V1.

Areas in the first virtual image V1 viewable by the user 30 with image light reaching the positions of the eyes 31 of the user 30 are hereafter referred to as viewable areas Va. Areas in the first virtual image V1 viewable by the user 30 with image light reaching the position of the left eye 31l of the user 30 are hereafter referred to as left viewable areas VaL. Areas in the first virtual image V1 viewable by the user 30 with image light reaching the position of the right eye 31r of the user 30 are hereafter referred to as right viewable areas VaR.

A virtual image barrier pitch VBp and a virtual image gap Vg are determined to satisfy Formula 1 and Formula 2 below using an optimum viewing distance Vd.

$$E:Vd=(n\times VHp):Vg \quad (1)$$

$$Vd:VBp=(Vdv+Vg):(2\times n\times VHp) \quad (2)$$

The virtual image barrier pitch VBp is the interval at which the light-reducing portions 92 appearing as the second virtual image V2 are arranged in a direction corresponding to u-direction. The virtual image gap Vg is the distance between the second virtual image V2 and the first virtual image V1. The optimum viewing distance Vd is the distance between the second virtual image V2 of the parallax barrier 9 and the position of the left eye 31l or the right eye 31r of the user 30 indicated by positional information obtained from the detector 1. An interocular distance E is the distance between the left eye 31l and the right eye 31r. The interocular distance E may be, for example, 61.1 to 64.4 mm, as calculated through studies conducted by the National Institute of Advanced Industrial Science and Technology. VHp is the horizontal length of each subpixel of the virtual image. VHp is the length of each subpixel of the first virtual image V1 in a direction corresponding to x-direction.

As described above, the left viewable areas VaL in FIG. 7 are defined on the virtual image plane Sv and viewable with the left eye 31l of the user 30 when image light transmitted through the transmissive portions 91 of the parallax barrier 9 reaches the left eye 31l of the user 30. As described above, the right viewable areas VaR are defined on the virtual image plane Sv and viewable with the right eye 31r of the user 30 when image light transmitted through the transmissive portions 91 of the parallax barrier 9 reaches the right eye 31r of the user 30.

Figure 8:
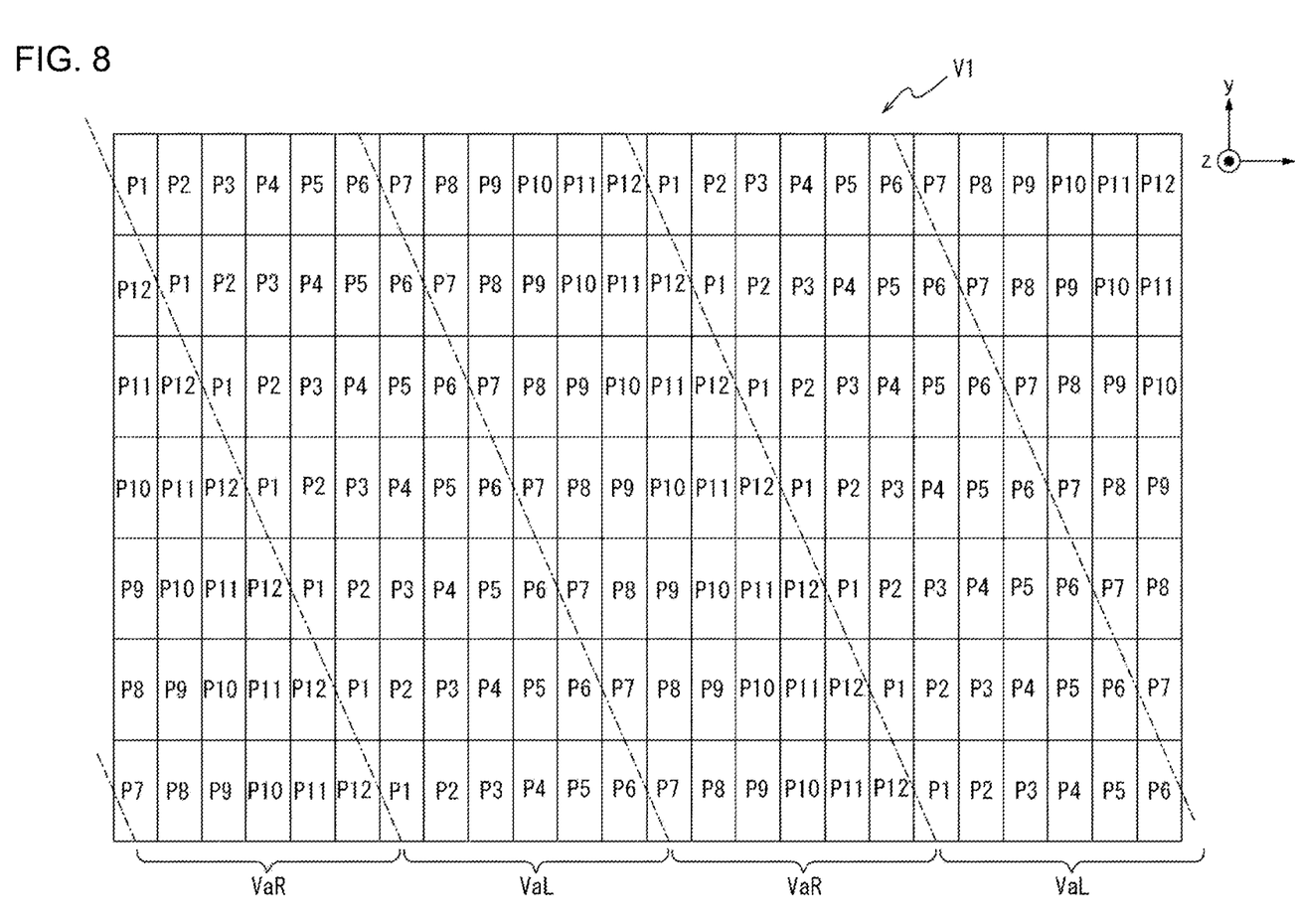
FIG. 8 is a diagram describing example display of subpixels in a virtual image corresponding to the display panel.

FIG. 8 shows an example array of subpixels of the first virtual image V1 as viewed from the left eye 31l and the right eye 31r of the user 30 using the parallax barrier 9 with an aperture ratio of 50%. The parallax barrier 9 with an aperture ratio of 50% includes the transmissive portions 91 and the light-reducing portions 92 each having the same width in x-direction. In FIG. 8, the dot-and-dash lines indicate a virtual image at the boundaries between the transmissive portions 91 and the light-reducing portions 92 in the parallax barrier 9. The left viewable areas VaL viewable with the left eye 31l and the right viewable areas VaR viewable with the right eye 31r extend diagonally with respect to x- and y-directions between the chain lines. The right viewable areas VaR are not viewable with the left eye 31l. The left viewable areas VaL are not viewable with the right eye 31r.

In the example shown in FIG. 8, each left viewable area VaL includes the virtual image of the entire area of each of the subpixels P2 to P5 arranged in the active area A and a major area of each of the subpixels P1 and P6 arranged in the active area A. The virtual image portions of the subpixels P7 to P12 arranged in the active area A are less easily viewable with the left eye 31l of the user 30. Each right viewable area VaR includes the virtual image of the entire area of each of the subpixels P8 to P11 arranged in the active area A and a major area of each of the subpixels P7 and P12 arranged in the active area A. The virtual image portions of the subpixels P1 to P6 arranged in the active area A are less easily viewable with the right eye 31r of the user 30. The controller 10 can cause the subpixels P1 to P6 to display the left eye image. The controller 10 can cause the subpixels P7 to P12 to display the right eye image. This allows the left eye 31l of the user 30 to mainly view the virtual image portions of the left eye image on the left viewable areas VaL and allows the right eye 31r to mainly view the virtual image portions of the right eye image on the right viewable areas VaR. As described above, the right eye image and the left eye image are parallax images having parallax between them. The user 30 views the right eye image and the left eye image as a 3D image.

The controller 10 causes the display panel 8 to display the right eye image and the left eye image having parallax between them. The controller 10 can change, based on the positions of the eyes 31 of the user 30, the area in which the left eye image appears and the area in which the right eye image appears on the display panel 8. The controller 10 switches the image to be displayed by the subpixels on the display panel 8 between the right eye image and the left eye image.

As described above, the left viewable areas VaL of the first virtual image V1 viewable by the eyes 31 of the user 30 may be located as shown in FIG. 8. In this case, the controller 10 can cause the subpixels P1 to P6 to display the left eye image. The right viewable areas VaR of the first virtual image V1 viewable by the eyes 31 of the user 30 may be located as shown in FIG. 8. In this case, the controller 10 can cause the subpixels P7 to P12 to display the right eye image. In another embodiment, the controller 10 can cause the subpixels P2 to P5 to display the left eye image, cause the subpixels P8 to P11 to display the right eye image, and cause the other subpixels P1, P6, P7, and P12 to display a black image with a luminance value of 0. This structure can reduce crosstalk effectively.

A change in the positions of the eyes 31 of the user 30 changes the range of the subpixels P1 to P12 used to display the virtual image viewable with the left eye 31l and the right eye 31r of the user 30. The controller 10 determines the subpixels to display the left eye image and the subpixels to display the right eye image among the subpixels P1 to P12 in each subpixel group Pg in accordance with the positions of the eyes 31 of the user 30 obtained by the input unit 6. The controller 10 causes the subpixels determined for the left eye image to display the left eye image. The controller 10 causes the subpixels determined for the right eye image to display the right eye image.

Figure 9:
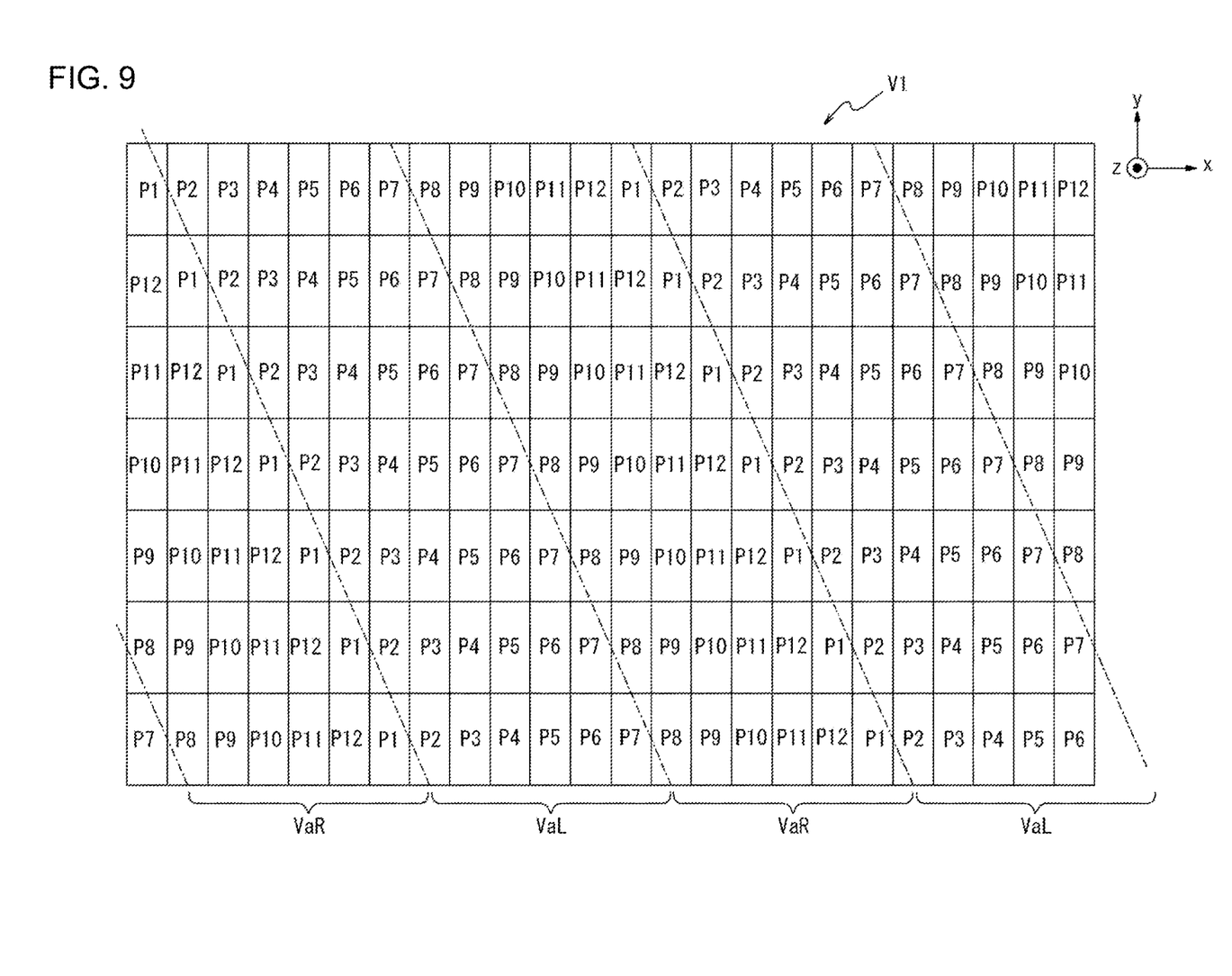
FIG. 9 is a diagram describing example display of subpixels in a virtual image corresponding to the display panel.

For example, the eyes of the user 30 observing the first virtual image V1 as shown in FIG. 8 may move relatively to the left. This causes the second virtual image V2 that is a virtual image of the parallax barrier 9 to move to the right. As shown in FIG. 9, for example, virtual image portions at the boundaries between the transmissive portions 91 and the light-reducing portions 92 of the parallax barrier 9 may move to the right as viewed from the user 30. This causes the left viewable areas VaL and the right viewable areas VaR to also move to the right. In the example shown in FIG. 9, each left viewable area VaL includes the entire area of each of the subpixels P3 to P6 and a major area of each of the subpixels P2 and P7. Each right viewable area VaR includes the entire area of each of the subpixels P9 to P12 and a major area of each of the subpixels P8 and P1. The controller 10 can thus cause the subpixels P2 to P7 on the display panel 8 to display the left eye image. The controller 10 can cause the subpixels P1 and P8 to P12 on the display panel 8 to display the right eye image.

The controller 10 controls the display panel 8 to allow the left eye image and the right eye image to appear as a 3D image in the field of view of the user 30. The controller 10 causes the display panel 8 to display an image of a target 3D object included in the left eye image and the right eye image with intended parallax between these images. The controller 10 may cause the display panel 8 to display images with parallax between them prestored in the memory 11. The controller 10 may calculate the parallax based on the distance to the 3D object to be displayed in the 3D image in real time, and use the parallax to generate the left eye image and the right eye image to be displayed by the display panel 8.

Although the embodiments of the present disclosure have been described with reference to the drawings and examples, those skilled in the art can easily make various modifications or alterations based on one or more embodiments of the present disclosure. Such modifications or alterations also fall within the scope of the present disclosure. For example, the functions of the components are reconfigurable unless any contradiction arises. Multiple components may be combined into a single unit or a single component may be divided into separate units. The embodiments of the present disclosure can also be implemented as a method or a program implementable by a processor included in the device, or as a storage medium storing the program. The method, program, and storage medium also fall within the scope of the present disclosure.

In the present disclosure, the first, the second, or others are identifiers for distinguishing the components. The identifiers of the components distinguished with the first, the second, and others in the present disclosure are interchangeable. For example, the first image may be interchangeable with the second image. The identifiers are to be interchanged together. The components for which the identifiers are interchanged are also to be distinguished from one another. The identifiers may be eliminated. The components without such identifiers can be distinguished with reference numerals. The identifiers such as the first and the second in the present disclosure alone should not be used to determine the order of components or to suggest the existence of smaller or larger number identifiers.

In the present disclosure, x-direction, y-direction, and z-direction are used for ease of explanation and may be interchangeable with one another. The Cartesian coordinate system including axes in x-direction, y-direction, and z-direction is used to describe the structures according to the present disclosure. The positional relationship between the components in the present disclosure is not limited to being orthogonal. The same applies to u-direction, v-direction, and w-direction. The same applies to p-direction, q-direction, and r-direction.

In the above embodiments, for example, the optical element that defines the traveling direction of image light is the parallax barrier 9. However, the optical element is not limited to a parallax barrier. The optical element may be a lenticular lens.

For example, the virtual image Ir appearing in an interior space of the movable body 20 may be an image of a 3D object. In this case, for example, a parallax barrier in accordance with the optical system for the first image is provided in addition to, for example, a parallax barrier for the second image. In other words, the controller 10 can display at least either the first image or the second image as a parallax image. The parallax barrier 9 that can define the traveling direction of image light for the parallax image may be provided in accordance with the optical system.

For example, the input unit 6 may receive information other than the positional information about the eyes 31 of the user 30. In this case, the controller 10 may change the position at which the virtual image Is of the second image appears in accordance with positional information and information other than positional information. The information other than positional information is, for example, the speed of the movable body 20.

Figure 10:
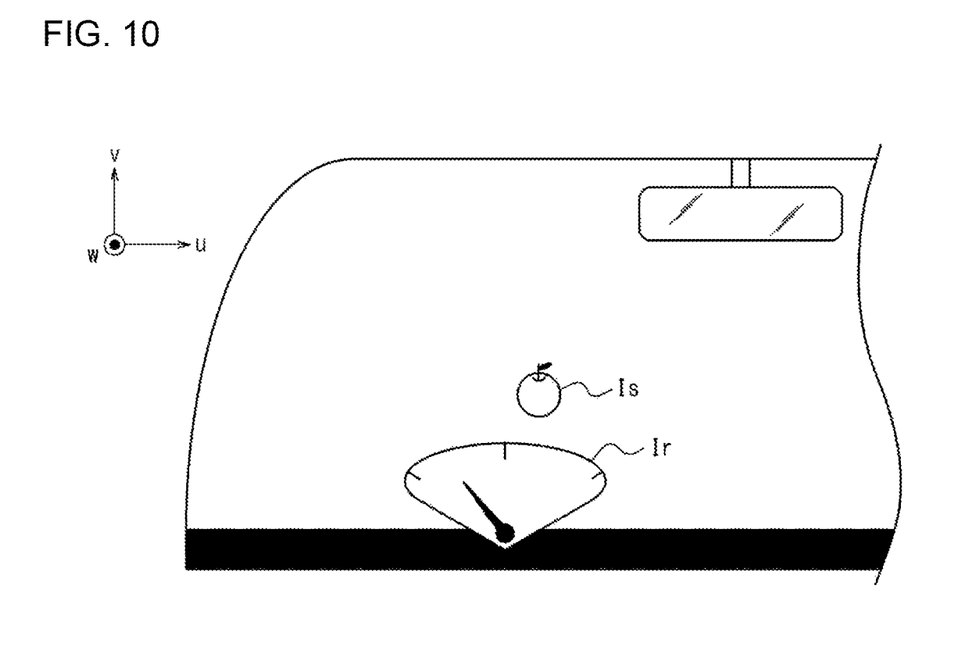
FIG. 10 is a diagram showing example displacement of a virtual image in accordance with the speed of the movable body.
Figure 11:
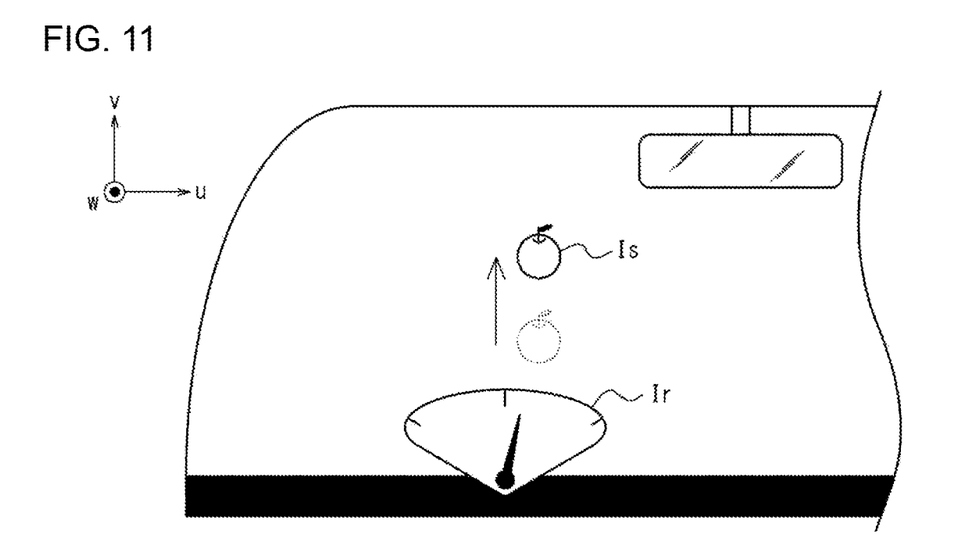
FIG. 11 is a diagram showing example displacement of the virtual image in accordance with the speed of the movable body.

FIGS. 10 and 11 are diagrams showing example displacement of the virtual image Is in accordance with the speed of the movable body 20. FIG. 10 shows the positional relationship between the virtual image Ir and the virtual image Is as viewed from the user 30 driving the movable body 20 at a first speed. The user 30 views the virtual image Is located frontward from the windshield while viewing the virtual image Ir in the interior space. The first speed is, for example, 30 km per hour. FIG. 11 shows the positional relationship between the virtual image Ir and the virtual image Is as viewed from the user 30 driving the movable body 20 at a speed faster than the first speed. As the speed of the movable body 20 increases, the driving user 30 directs the gaze farther in the traveling direction. In other words, the gaze of the user 30 moves upward as the speed of the movable body 20 increases.

As shown in FIG. 11, the controller 10 changes the position at which the virtual image Is of the second image appears upward as viewed from the user 30 as the speed of the movable body 20 increases to allow the virtual image Is of the second image to remain appearing at a position at which the user 30 directs the gaze. The controller 10 changes the position at which the virtual image Is of the second image appears downward as viewed from the user 30 as the speed of the movable body 20 decreases. More specifically, the controller 10 adjusts the left eye image and the right eye image in the second image displayed on the display panel 8 to change the position at which the virtual image Is appears upward or downward. In the examples in FIGS. 10, 11, and 1, the upward direction is the positive v-direction. The downward direction is the negative v-direction. In this manner, the controller 10 changes, in accordance with the speed of the movable body 20, the position at which the virtual image Is of the second image appears. This allows the user 30 to continue, without shifting the gaze greatly, viewing the virtual image Is at the position at which the user 30 directs the gaze.

In response to a change in the speed of the movable body 20, the controller 10 may not change the position at which the virtual image Ir of the first image appears and may change the position at which the virtual image Is of the second image appears. The virtual image Ir of the first image appears relatively large near the user 30. The user 30 is thus more likely to continue viewing the virtual image Ir when shifting the gaze in response to a change in the speed of the movable body 20. With the virtual image Ir of the first image appearing at the position unchanged when the speed of the movable body 20 changes, the controller 10 can reduce the computational load.

The HUD and the movable body according to one or more embodiments of the present disclosure can display a virtual image viewable at a position nearer a user.

The present disclosure may be embodied in various forms without departing from the spirit or the main features of the present disclosure. The embodiments described above are thus merely illustrative in all respects. The scope of the present invention is defined not by the description given above but by the claims. Any modifications and alterations contained in the claims fall within the scope of the present invention.

REFERENCE SIGNS LIST 1 detector
2 head-up display (HUD)
4 first optical member
5 display device
6 input unit
7 illuminator
8 display panel
9 parallax barrier
10 controller
11 memory
14 second optical member
140 plate
141 transparent substrate
142 second light-reflective portion
143 first light-reflective portion
20 movable body
30 user
31 eye
311 left eye
31r right eye
91 transmissive portion
92 light-reducing portion
100 head-up display (HUD) system
A active area
Ir virtual image
Is virtual image
Sv virtual image plane
V1 first virtual image
V2 second virtual image
VaL left viewable area
VaR right viewable area

The invention claimed is:

1. A head-up display mounted on a movable body, comprising:
 a display device which displays a first image and emits image light from the first image in a first direction;
 a first optical member located in the first direction from the display device;
 a second optical member located between the display device and the first optical member in the first direction;
 a detector which detects positions of eyes of a user in the movable body;
 an input part which is connected to the detector and receives inputs of positional information of detected positions of the eyes and a speed of the movable body driven by the user; and
 a controller which is connected to the input part and changes, in accordance with the positional information, a position at which a virtual image of the first image appears,
 the second optical member reflecting the first image in a first plane direction and a second plane direction and displaying a virtual image of the first image in a space between the first optical member and the user,
 the display device displaying a second image and emitting image light from the second image in the first direction,
 the first optical member causing specular reflection of the second image and displaying a virtual image of the second image in a space opposite to, across the first optical member, the space in which the virtual image of the first image appears, in response to a change in the speed, the controller not changing the position at which the virtual image of the first image appears and changing the position at which the virtual image of the second image appears.

2. The head-up display according to claim 1, wherein the second optical member causes specular reflection of the first image in the first plane direction and causes retroreflection of the first image in the second plane direction.

3. The head-up display according to claim 1, wherein the second optical member causes specular reflection of the first image in the first plane direction and causes refractive reflection of the first image in the second plane direction.

4. The head-up display according to claim 1, wherein the controller changes, in accordance with the positional information, a lower limit position at which the virtual image of the first image appears.

5. The head-up display according to claim 1, wherein the controller changes the position at which the virtual image of the second image appears upward as viewed from the user in response to an increase in the speed.

6. The head-up display according to claim 1, wherein the controller changes the position at which the virtual image of the second image appears downward as viewed from the user in response to a decrease in the speed.

7. The head-up display according to claim 1, wherein the controller changes, in accordance with the speed and the positional information, the position at which the virtual image of the second image appears.

8. The head-up display according to claim 1, wherein the display device displays at least one of the first image or the second image as a parallax image, and includes an optical panel defining a traveling direction of image light from the parallax image to define a visual field for the parallax image.

9. The head-up display according to claim 8, wherein the optical panel uses an active method.

10. The head-up display according to claim 8, wherein the optical panel uses a passive method.

11. A movable body comprising:
a head-up display including
 a display device which displays a first image and emits image light from the first image in a first direction,
 a first optical member located in the first direction from the display device,
 a second optical member located between the display device and the first optical member in the first direction,
 a detector which detects positions of eyes of a user in the movable body,
 an input part which is connected to the detector and receives inputs of positional information of detected positions of the eyes and a speed of the movable body driven by the user, and
 a controller which is connected to the input part and changes, in accordance with the positional information, a position at which a virtual image of the first image appears,
the second optical member causing specular reflection of the first image in a first plane direction, causing retroreflection of the first image in a second plane direction, and displaying a virtual image of the first image in a space between the first optical member and the user,
the display device displaying a second image and emitting image light from the second image in the first direction,
the first optical member causing specular reflection of the second image and displaying a virtual image of the second image in a space opposite to, across the first optical member, the space in which the virtual image of the first image appears,
in response to a change in the speed, the controller not changing the position at which the virtual image of the first image appears and changing the position at which the virtual image of the second image appears.

* * * * *